US012491519B2

(12) United States Patent
Zöllig

(10) Patent No.: US 12,491,519 B2
(45) Date of Patent: Dec. 9, 2025

(54) ROTOR PART OF AN IMPACT MILL

(71) Applicant: swissRTec AG, Altnau (CH)

(72) Inventor: Mario Zöllig, Kreuzlingen (CH)

(73) Assignee: swissRTec AG, Altnau (CH)

( * ) Notice: Subject to any disclaimer, the term of this patent is extended or adjusted under 35 U.S.C. 154(b) by 233 days.

(21) Appl. No.: 18/374,031

(22) Filed: Sep. 28, 2023

(65) Prior Publication Data

US 2024/0109073 A1 Apr. 4, 2024

(30) Foreign Application Priority Data

Sep. 29, 2022 (CH) ................................ 001122/2022

(51) Int. Cl.
*B02C 13/28* (2006.01)

(52) U.S. Cl.
CPC ................................ *B02C 13/2804* (2013.01)

(58) Field of Classification Search
CPC .... B02C 2013/1878; B02C 2013/2808; B02C 2013/29; B02C 13/2804; B02C 13/28; B02C 13/18; B02C 13/1814; B02C 13/06
See application file for complete search history.

(56) References Cited

U.S. PATENT DOCUMENTS 4,142,687 A * 3/1979 Potwin .................... B02C 13/14 241/197
7,744,028 B2 * 6/2010 Zollig .................. B02C 13/282 241/300
7,753,302 B2 * 7/2010 Zollig .................. H02G 3/0666 241/294
2024/0109074 A1 4/2024 Zöllig

FOREIGN PATENT DOCUMENTS

EP 1960108 B1 8/2008
EP 1960109 B1 8/2008

* cited by examiner

*Primary Examiner* — Bobby Yeonjin Kim
(74) *Attorney, Agent, or Firm* — Fleit Intellectual Property Law; Paul D. Bianco

(57) ABSTRACT

An enhanced operating comfort is to be achieved in a rotor part of an impact mill with a plurality of rotor tool blades detachably attachable to a blade attachment plate. This is achieved by recessing a spacer recess out of each rotor tool blade, recessing a blade holding recess and a plate spacer recess out of the blade attachment plate at each blade position, and having one spacer per rotor tool blade that can be held rotatably in the spacer recess and fixed in the plate spacer recess. An impact bead is arranged circumferentially at the upper edge of spacer, and each blade holder fixes a rotor tool blade to the blade attachment plate, and hence interacts with the spacer to prevent a movement by the rotor tool blade parallel and perpendicular to the longitudinal axis.

10 Claims, 3 Drawing Sheets

FIG. 5 A-A
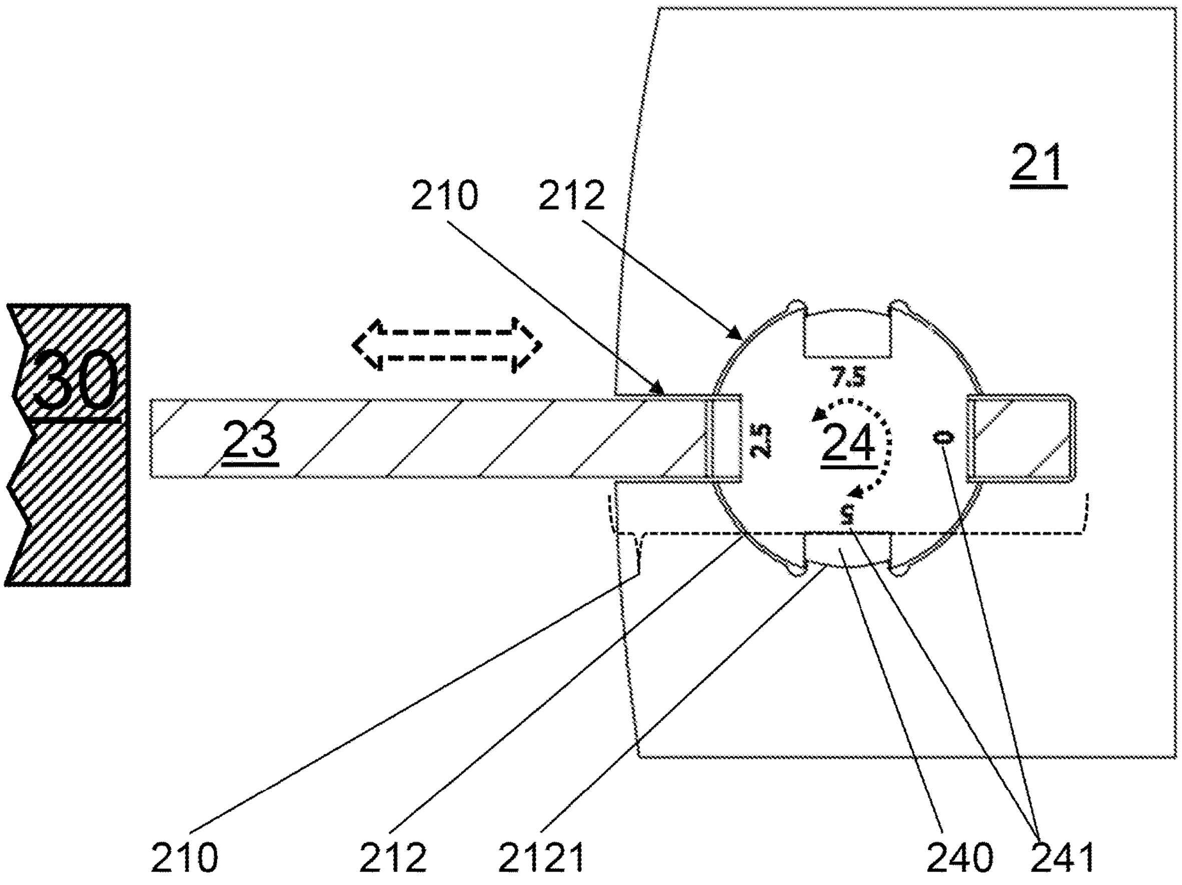

ROTOR PART OF AN IMPACT MILL

FIELD OF THE INVENTION

The present invention describes a rotor part of an impact mill, which has a plurality of rotor tool blades that can be detachably attached to a blade attachment plate, wherein each rotor tool blade can be detachably attached to an allocated blade position with a blade holder, and the entire rotor part is rotatably mounted around a longitudinal axis by means of a rotor part attachment sleeve attached to a drive in an impact mill housing at a defined radial distance to a stator part with a plurality of stator tools, and a method for adjusting the distance between a rotor tool blade detachably attached to a blade attachment plate of a rotor part of an impact mill relative to a stator part fixedly arranged on an inner surface of an impact mill housing or its stator tools.

BACKGROUND

Impact mills or rotor mills have long been known, and are becoming increasingly important during the treatment of used materials for their recycling. Such impact mills are used for comminuting soft, medium-hard and fibrous, brittle materials. The applicant wanted to develop an impact mill that can also be specially used for the posttreatment and entanglement of anode and cathode material from Li-ion battery recycling. The input material is fed into the impact mill from above, and moved inside of an impact mill housing between a stator part and a rotor part. As the rotor part with its rotor tools rotates along the rigid stator part with correspondingly fixed stator tools, high impact forces act on the material, the adhering black mass is detached in the process, and the anode and cathode material is simultaneously comminuted, taking the form of spheres. The material is here pneumatically conveyed through the impact mill. Rotor parts usually range in diameter between one and two meters, the number of rotors ranges between 10 and 30, and rotor speeds of 40 to 100 m/s are reached, wherein rotors with counterclockwise and clockwise rotation are preferred.

Known from EP1960108 is an insertable impact mill with an impact mill housing, wherein a stator part is arranged locally fixed on the impact mill housing, and at least one rotatable rotor part with rotor tool blades is moved at a defined distance relative to the stator part. The rotor tool blades were detachably attached to a blade attachment plate, wherein above all a simplified replacement of individual rotor tool blades was achieved. The individual rotor tool blades were positively held above and below the blade attachment plate by tool holding brackets. Accordingly, rotor tool blades tailored to the two tool holding brackets had to be manufactured, and were thus manufactured with as little wear as possible out of high strength steel. The tool holding bracket was optimized for attaching the rotor tool blade to the blade attachment plate as easily as possible. As a whole, replacing rotor tool blades is cumbersome, and given the elevated number of individual components often leads to problems or must be done extremely carefully. The same also holds true for a potentially desired dislocation of the rotor tool blade in a radially outward direction.

Therefore, even though impact mills and rotor parts with reusable and replaceable rotor tool blades are known, the convenience of rotor tool blade replacement and a distance adjustment relative to the stator part 3 are disadvantageous and time-consuming.

Finally, the user friendliness is not good, and the impact mill is anything but easy to maintain.

SUMMARY OF THE INVENTION

One aspect of the present invention relates to further developing an impact mill or a rotor part of an impact mill, so as to achieve an enhanced operating comfort. The replacement of rotor tool blades, but also the easy and quick adjustment of the distance of the rotor tool blades relative to the stator tools of the stator part, lead to an enormously enhanced user friendliness. In comparison to the replaceable rotor tool blades known from prior art, a quick adjustment is here achieved, and an unintended incorrect setting in practice is also avoided in the process.

The distance adjustment method is also disclosed herein.

Variations in feature combinations or slight adjustments of the invention can be found in the detailed description, are shown on the figures, and are incorporated into the claims.

BRIEF DESCRIPTION OF THE DRAWINGS

A preferred exemplary embodiment of the inventive subject matter is described below in conjunction with the attached drawings in the detailed description.

Additional features, details and advantages of the invention can likewise be gleaned from the following description of slightly modified embodiments of the invention, which in part are made clear to the expert solely from the drawings. Shown on:

FIG. 3 is a sectional view through the rotor part with completely mounted rotor tool blades, while

FIG. 5 is a sectional view according to A-A from FIG. 3 through a part of the blade attachment plate in the area of a rotor tool blade.

DETAILED DESCRIPTION

Figure 1:
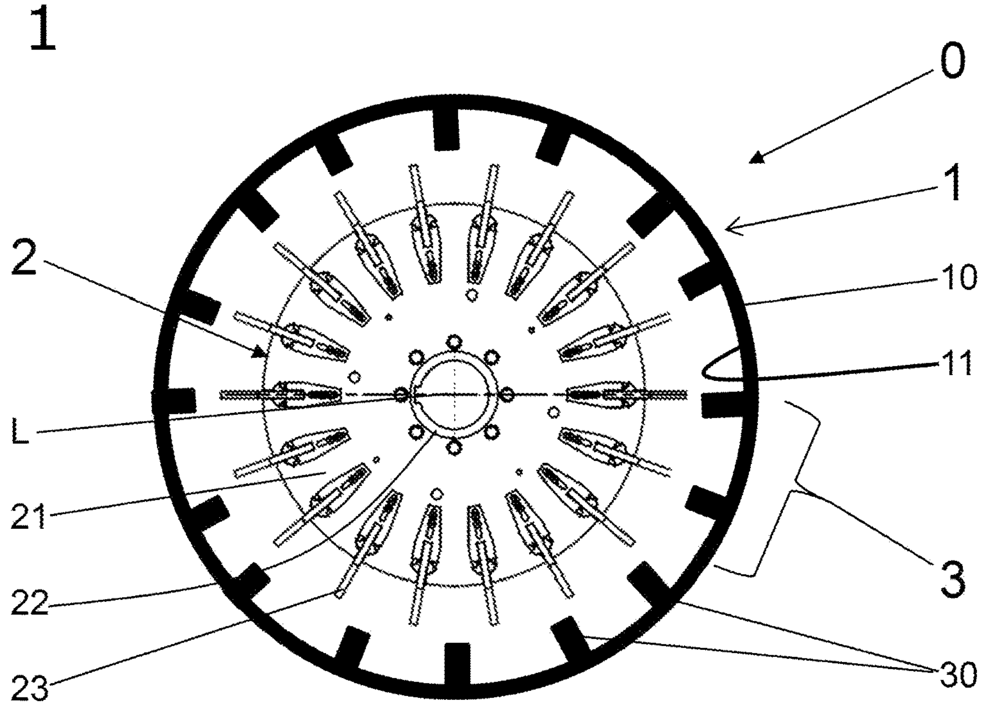
FIG. 1 is a view of an open impact mill housing with a view of a stator part and the stator part.

An impact mill 0 is described, which has an impact mill housing 1 with an essentially cylindrical impact mill housing wall 10 and a corresponding inner surface 11. A stator part 3 of the impact mill 0 is arranged along the inner surface 11 and can have a plurality of stator tools 30, which can have varying dimensions and, in known embodiment types, are arranged directly or indirectly attached to the inner surface 11 from outside or inside.

Necessary components, such as a drive unit with at least one motor and electronics for controlling and monitoring the impact mill, are not shown here and not described in any more detail, since these components are known to the expert. The shape of a drive shaft, mounting of the drive shaft, number of rotor parts and detailed design of the stator part 3 are here of no further interest for the inventive idea, and can be designed in different versions.

A rotor part 2 rotatably mounted around a longitudinal axis L in the impact mill housing 1 is here particularly interesting. The rotor part 2 has a blade attachment plate 21, a rotor part attachment sleeve 22 and a plurality of rotor tool blades 23 attached thereto. The blade attachment plate 21 is also referred to as a star plate, because the radially outwardly protruding rotor tool blades 23 create the shape of a multi-armed star.

During the rotation of the rotor part 2 or the blade attachment plate 21 with all components attached thereto, grinding material can be comminuted in the space between stator tools 30 fixed between rotor tool blades 23.

Figure 2:
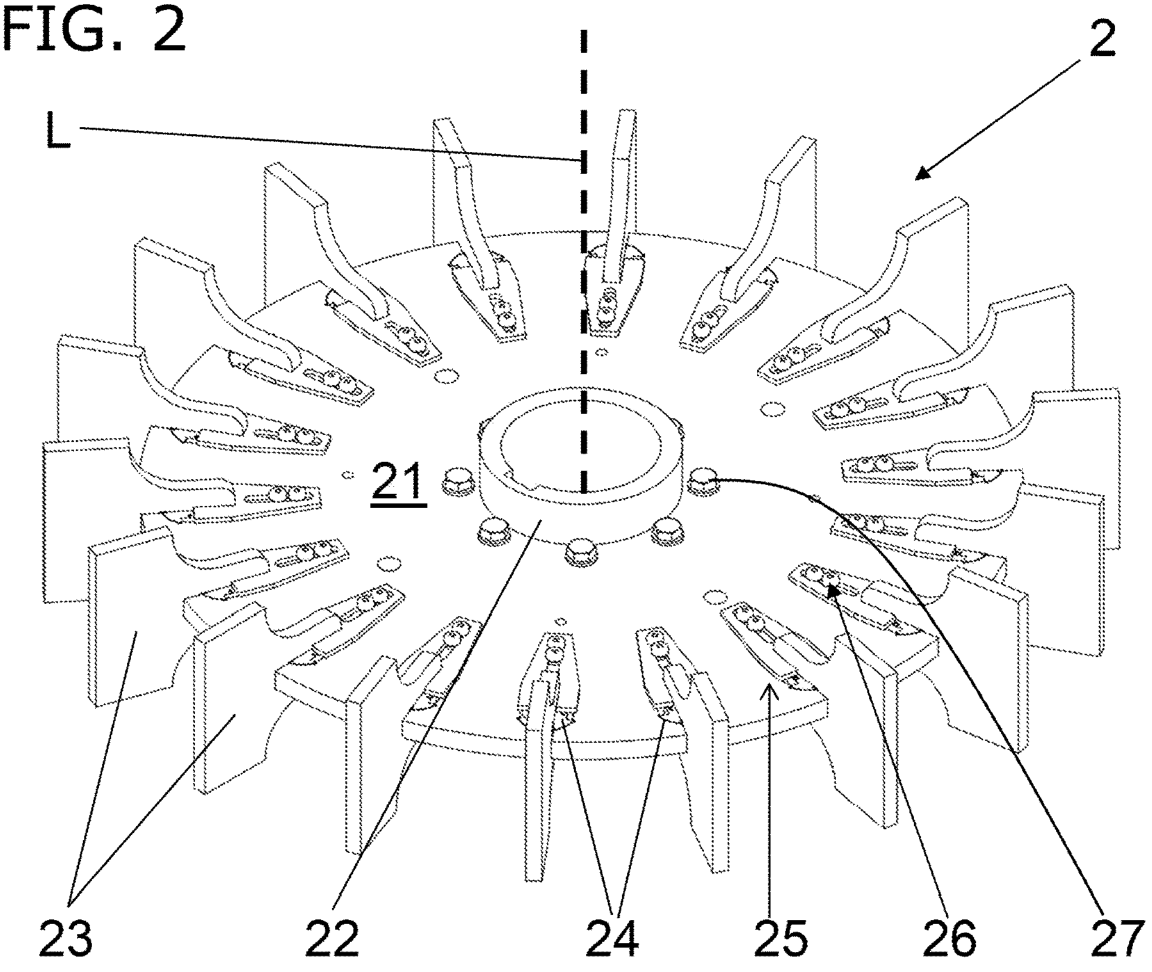
FIG. 2 is a perspective view of a rotor part with blade attachment plate and rotor part attachment sleeve.

The rotor part 2 shown on FIG. 2 has a simplified replaceability of the rotor tool blades 23. For this purpose, a respective spacer 24 effectively connected with a blade holder is arranged on each rotor tool blade 23.

The blade holder is here exemplarily designed as a blade holding plate 25. The latter ensures that the rotor tool blade 23 in which the spacer 24 is inserted cannot wander toward the top. Each rotor tool blade 23 is detachably held on the blade attachment plate 21 secured against rotation with one blade holding plate 25 per rotor tool blade 23. The gap or slit as the blade holding recess 210 in the front part of the blade attachment plate 21 ensures the tilting away or rotation from the rotor tool blade 23. For example, the rotor tool blade 23 is 15 mm thick, and the blade holding recess 210 is 15.5 mm wide. If the blade holding plate 25 is selected as the blade holder, it can be secured by used blade holder attachment means 26. This results in a simple, detachable connection of the rotor tool blade 23 to the blade attachment plate 21. The blade holder attachment means 26 do not necessarily have to be removed or detached to enable a linear displacement of the blade holding plate 25. A sufficient stability and holding of the rotor tool blade 23 is ensured nonetheless. The blade attachment plate 21 is freely movable and, if an attachment was forgotten about, is outwardly displaced while turning up, and hence rotating, the rotor part 2.

However, instead of using the blade holding plate 25, it would also be possible to directly screw the rotor tool blade 23 to the blade attachment plate 21 with a screw, the screw head of which protrudes at least partially over the spacer 24. The blade holder would then be at least one screw, the head of which upwardly secures the spacer 24 directly via the screw head, which protrudes at least partially over the spacer 24. While this would eliminate the need for the blade holding plate 25, corresponding screws and threaded holes or lock nuts would have to be provided. However, the technical effect would be the same, with the detachability of the rotor tool blade 23 with spacer 24 being more complicated.

The blade attachment plate 21 is attached to the rotor attachment sleeve 22 using sleeve attachment means 27, usually in the form of screws, nuts, and washers. Since operation involves exposure to enormous centrifugal forces and high radial accelerations, the fixation of the rotor tool blade 23 and naturally the blade attachment plate 21 must be ensured.

Figure 3:
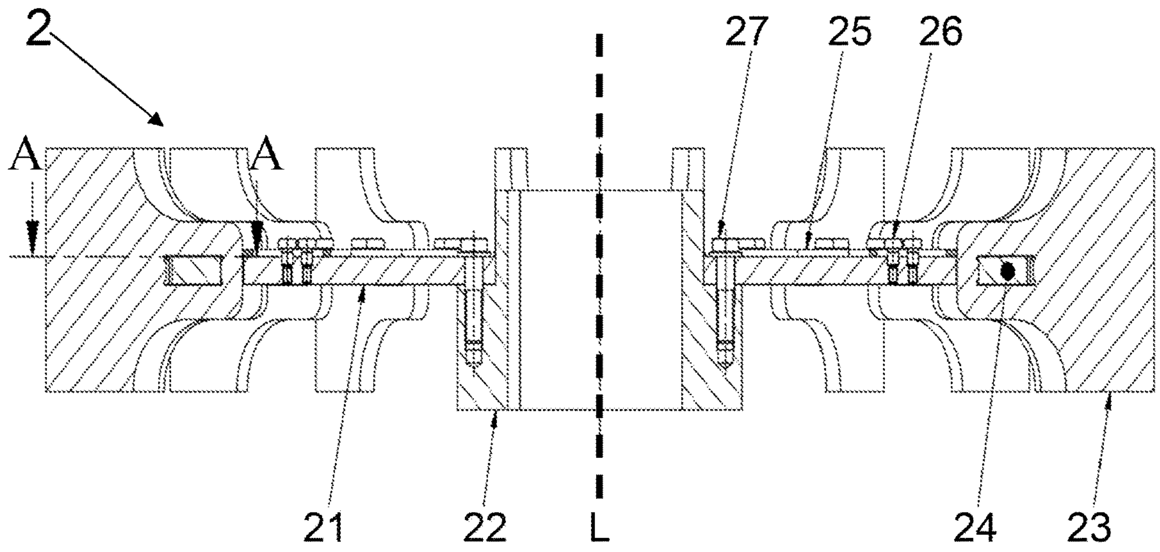

The sectional view on FIG. 3 shows the components of the rotor part 2 once again. The replaceability of the rotor tool blades 23 is simplified by the use of the respective spacer 24, because the blade holder in the form of the blade holding plate 25 permits an indirect, detachable attachment of the rotor tool blade 23 to or in the blade attachment plate 21. In order to change or install a rotor tool blade 23, the blade holding attachment means 26 can be detached, so that the blade holding plate 25 can be shifted parallel to the blade attachment plate 21. The individual procedural steps are denoted on FIG. 4 with Roman letters and dashed arrows. In a slight modification, the blade holding attachment means 26 can be designed in such a way that they do not have to be detached to linearly displace the blade holding plate 25.

However, the configuration of the components blade attachment plate 21, rotor tool blade 23 and blade holding plate 25 will first be briefly described.

An oblong blade holding recess 210 and a round plate spacer recess 212 are provided in the blade attachment plate 21 at the location of each rotor tool blade 23, i.e., each blade position. The spacer 24 also has a round design, and can be passed through the plate spacer recess 212 parallel to the longitudinal axis L.

In optimized embodiments, the plate spacer recess 212 is provided with a positioning protrusion 2121 and/or with a recess impact bead 2122. The oblong blade holding recess 210 is used to receive the portion of the rotor tool blade 23. In order for the spacer 24 to be effectively connectable with the rotor tool blade 23, each rotor tool blade 23 is arranged [on] a spacer recess 230 recessed on its side oriented to the longitudinal axis L. The spacer 24 can be laterally introduced into the spacer recess 230, and then be inserted into the oblong blade holding recess 210 with the rotor tool blade 23, which here takes place from above the blade attachment plate 21.

A recess impact bead 2122 is arranged on the plate spacer recess 212 along a lower edge lying opposite the introduction side of the rotor tool blade 23. This recess impact bead 2122 protrudes toward the center of the plate spacer recess 212, so that the spacer 24 cannot slide downwardly through the blade attachment plate 21 or the plate spacer recess 212.

As an option, a bead receptacle 2123 can also be arranged at the upper edge of the plate spacer recess 212, which is favorable depending on the design of the spacer 24.

The recess impact bead 2122 and the bead receptacle 2123 are here designed as an option or additional feature, so that the spacer 24 does not fall through downwardly. At least the configuration of a continuous impact bead 242 on the edge of the spacer 24 has become established in practice, as evident on FIG. 4. The circumferential impact bead 242 is at the upper edge of the spacer 24, so that it rests on the blade attachment plate 21 with the spacer 24 fixed in place in the spacer recess 230.

The blade holder is designed as a blade holding plate 251, which here has a blade receiving recess 251, thereby yielding a forked shape. The width of the blade receiving recess 251 is slightly larger than the width of the side of the rotor tool blade 23 to be introduced, so that the blade holding plate 25 can be displaced parallel to the blade attachment plate 21 radially toward the rotor tool blade 23 with the rotor tool blade 23 inserted into the blade holding recess 210 or given a free blade holding recess 210. This procedural step is marked I on FIG. 4. The blade holder attachment means 26 can be detached prior to the displacement. Given a loose blade attachment plate 21, the blade attachment plate 21 is outwardly displaced by the centrifugal force. An oblong displacement hole 250 is recessed into the blade holding plate 25 opposite the blade receiving recess 251, so that the blade holder attachment means 26 do not have to be completely detached before the blade holding plate 25 can be linearly displaced.

If the blade holding plate 25 according to step I has been radially displaced toward the center of the blade attachment plate 21, the rotor tool blade 23 with the spacer 24 introduced into the spacer recess 230 can be pulled out upwardly, parallel to the longitudinal axis L in a step II. In this way, rotor tool blades 23 can be easily and quickly exchanged and replaced, with only the two steps I and II being required.

In practice, however, the rotor tool blade 23 should not be completely replaced so as to save on resources. The rotor tools 23 should be used multiple times, and only replaced once completely worn. Enormous importance is today attached to the optimized use of the rotor tool blades 23, and hence to a reduction in wear costs. Setting the gap between the rotor part 2 and stator tools is essential to the actual process. The gap has a very strong influence on the quality of disintegration, entanglement, and comminution. The narrower it is, the better the quality and fineness of the product, with the wear, energy demand, and process warmth in turn increasing, and the throughput decreasing. In order to solve this problem, attachment by means of a spacer 24 might also prove useful. The aim is thus to have a variable adjustment of the distance between the plurality of rotor tool blades 23, which are detachably attached to the blade attachment plate 21 of the rotor part 2, relative to the plurality of stator tools 30, which are arranged on the inner surface 11 of the impact mill housing 1.

Figure 4:
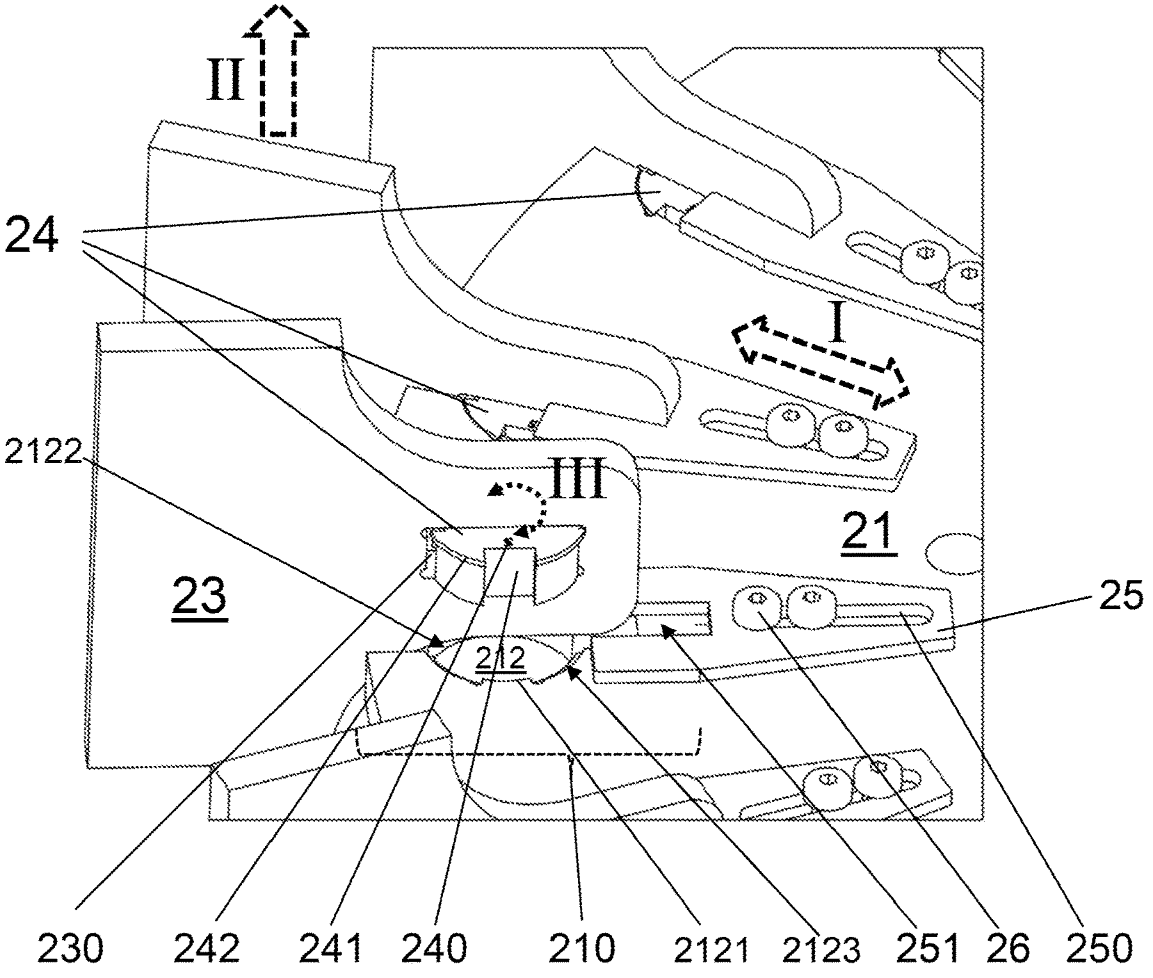
FIG. 4 is a perspective partial view of the rotor part during assembly of a rotor tool blade with spacer in a blade holder.

The spacer 24 here has several recesses 240 along its circumference that are recessed so as to cross parallel to the longitudinal axis of the spacer 24. These recesses 240 have varying depths, wherein a depth is understood as the distance between the circumference and end of the recess 240 toward the center of the recess 240. Specifically shown on FIGS. 4 and 5 are spacers 24 each having four recesses 240 that cross completely in the longitudinal direction, meaning parallel to a longitudinal axis. At least one recess 240 can be introduced into at least one positioning projection 2121 on the plate spacer recess 212 in an effectively connectable manner.

The spacer 24 could also be designed with more or less than four recesses 240 in spacer 24, each with varying depths of the recesses 240.

As evident from the partial sectional view on FIG. 5 along the A-A line on FIG. 3, the rotor tool blade 23 can be detachably attached in the blade attachment plate 21 in four different alignments of the spacer 24. With the rotor tool blade 23 installed, the spacer 24 is held in the plate spacer recess 212, while the rotor tool blade 23 is held in the blade holding recess 210. The distance between the tip of the rotor tool blade 23 and the stator tool 30 is set depending on the orientation of the spacer 24 or with its recess 240 facing the center of the blade attachment plate 21 in a radial direction. An undesired twisting of the spacer 24 in the plate spacer recess 212 is not possible due to the at least one positioning projection 2121, since insertion into the recesses 240 of the spacer 24 is only possible at these positions. The spacer 24 can be freely rotated in the spacer recess 230 in the rotor tool blade 23, and can be placed in the plate spacer recess 212 along with the rotor tool blade 23 in only four defined orientations.

As denoted by a double arrow, the rotor tool blade 23 can be held by means of the spacer 24 in the spacer recess 230 in the plate spacer recess 212 of the blade attachment plate 21, and the distance between the tip of the rotor tool blade 23 and the stator tool 30 can even be varied.

As evident on FIG. 5, a marking 241 assigned to the various recesses 240 should be printed, lasered or embossed onto at least one face of the spacer 24. Four different markings 0, 2.5, 5 and 7.5 are here imprinted. The higher the value, the larger the flight circle of the rotor tool blade 23, and the smaller the distance to the stator tool 30. With the rotor tool blade 23 mounted in the blade attachment plate 21, the rotor tool blade 23 is kept radially in the respective outer position by the centrifugal force. The markings 241 can be identified with various colors.

Method for Distance Adjustment

If the tip of the rotor tool blade 23 facing the stator part 3 is worn, the distance of the rotor tool blade 23 relative to the stator part 3 can be varied as follows.

The blade holding plate 25 is first detached if the blade holding plate 25 was attached, wherein this step can otherwise be skipped, and linearly pushed away from the blade holding recess 210 and the spacer recess 230 toward the center of the blade attachment plate 21, according to procedural step I.

The rotor tool blade 23 together with the spacer 24 inserted into the spacer recess 230 is now pulled out toward the top, parallel to the longitudinal axis L in step II, as readily visible on FIG. 4. The blade holder attachment means 26 is detached prior to the displacement. Top is here to be construed as the side of the blade attachment plate 21 on which the blade holder plate 25 is arranged.

In order to now achieve a varied distance from the stator part 3 during the reinstallation of the same rotor tool blade 23, the spacer 24 is rotated around its longitudinal axis in a third step III, until a recess 240 different than before lies in the spacer recess 230, facing the tip of the rotor tool blade 23. This is denoted by the dashed double arrow on FIG. 4. The rotor tool blade 23 with spacer 24 is thereafter introduced into the blade holding recess 210 and plate spacer recess 212 again, as shown on FIG. 5. The blade holder plate 25 is subsequently pushed to the outer edge of the blade attachment plate 21 once more, wherein the blade attachment plate 21 is partially pushed over the spacer 24, so that the rotor tool blade 23 is indirectly secured against upwardly sliding away by the spacer 24. As soon as the blade holder plate 25 has again been attached and the process was repeated for searched rotor tool blades 23, the impact mill housing 1 can be loaded and closed, and the impact mill 0 can resume its operation.

The distance adjustment process can be repeatedly performed with a rotor tool blade 23 before a replacement comes due. This distance adjustment is comparatively quick and easy. The rotor tool blade 23 is indirectly held in the blade holding recess 210 and plate spacer recess 212 detachably and positively by means of the spacer (24) and the blade holder attachment means 26.

In our case, three such rotor parts 2 form the rotor in three planes. The planes can be mounted in line or offset, which influences the duration in which the material passes from the top down. If the material remains in the mill longer, disintegration improves, and throughput decreases.

We regard as ideal the rotor height that arises with three planes comprised of rotor parts 2. We can adjust the rotor tools to the disintegration/comminution process in the three planes accordingly, i.e., reduce the gap between the rotor part 2 and stator part 3 from the top down. As a rule, different planes with mounted rotor tool blades 23 are set to different gap dimensions, with the rotor tool blades 23 in the uppermost plane being set to a largest gap, wherein the setting is determined by the size and type of input material. The further down the material passes in the impact mill 0, the more it becomes entangled/comminuted. The gaps in the lower planes are thus set at increasingly narrower dimensions.

| Reference List |
|---|
| 0 Impact mill |
| 1 Impact mill housing |
| 10 Impact mill housing wall (cylindrical) |
| 11 Inner surface |
| 2 Rotor part (at least one) |
| 21 Blade attachment plate |
| 210 Blade holding recess (space for blades and spacer in plane) |
| 212 Plate spacer recess |
| 2121 Positioning projection (240 enters there) |
| 2122 Recess impact bead |
| 2123 Optional bead receptacle |
| 22 Rotor part attachment sleeve |
| 23 Rotor tool blade |
| 230 Spacer recess (for spacer in 23, transverse to plane) |
| 24 Spacer |
| 240 Recesses (varying depths) |
| 241 Markings (adjustment travel in stator part direction, radial) |
| 242 Impact bead (partially along edge) |
| Blade holder |
| 25 Blade holder plate |
| 250 Oblong displacement hole |
| 251 Blade receiving recess |
| 26 Blade holder attachment means |
| 27 Sleeve attachment means |
| 3 Stator part (rigid in impact mill housing, circumferential) |
| 30 Stator tool (plurality, varying width, varyingly attached) |

The invention claimed is:

1. A rotor part of an impact mill, wherein the rotor part comprising a plurality of rotor tool blades that can be detachably attached to a blade attachment plate, wherein each rotor tool blade can be detachably attached to an allocated blade position with a blade holder, and the entire rotor part is configured to be rotatably mounted around a longitudinal axis by means of a rotor part attachment sleeve attached to a drive in an impact mill housing at a defined radial distance to a stator part with a plurality of stator tools, wherein a spacer recess is recessed into each rotor tool blade, a blade holding recess and a plate spacer recess is recessed into blade attachment plate at each blade position, and a spacer per rotor tool blade can be rotatably mounted in the spacer recess and fixed in the plate spacer recess, wherein a circumferential impact bead is arranged at the upper edge of the spacer, and each blade holder fixes a rotor tool blade to the blade attachment plate, and hence interacts with the spacer to prevent a movement by the rotor tool blade parallel and perpendicular to the longitudinal axis.

2. The rotor part according to claim 1, wherein the blade holder is a blade holder plate, which holds the rotor tool blade on the blade fastening plate by means of a blade holder attachment.

3. The rotor part according to claim 2, wherein the blade holder plate is linearly displaceable, on the tool side has a blade receiving recess as a gap facing the rotor tool blade, and the blade holder attachment is arranged in an oblong displacement hole in the blade attachment plate.

4. The rotor part according to claim 3, wherein a recess impact bead is at least partially circumferentially arranged on a side of the plate spacer recess.

5. The rotor part according to claim 1, wherein several recesses varying in depth are recessed along a circumference of the spacer, parallel to the longitudinal axis of the spacer.

6. The rotor part according to claim 4, wherein at least two recesses are recessed with two different depths so as to completely cross the spacer in a longitudinal direction.

7. The rotor part according to claim 4, wherein markings assignable to the recesses are configured to be printed, lasered or embossed onto at least one face of the spacer.

8. An impact mill comprising an impact mill housing and a cylindrical impact mill housing wall, on whose inner surface a circumferential stator part with a plurality of stator tools is arranged, and at least one rotor part according to claim 1 is rotatably arranged.

9. A method for adjusting the distance between a rotor tool blade detachably attached to a blade attachment plate of a rotor part of an impact mill relative to a stator part fixedly arranged on an inner surface of an impact mill housing or stator tools of the stator part, the method comprising:

I detaching a blade holder from the rotor tool blade,

II lifting up the rotor tool blade with a spacer out of a blade holding recess and a plate spacer recess in the blade attachment plate, and then III rotating the spacer, so that another recess of the spacer faces toward the side lying opposite the tip of the rotor tool blade, and the rotor tool blade with the spacer is thereby held indirectly and introduced back into the blade holding recess and the plate spacer recess, and again fixed to the blade attachment plate by means of the blade holder.

10. The method according to claim 9, wherein the blade holder is a blade holder plate that can be fixed by means of a blade holder attachment, so that the rotor tool blade is exposed in step I by linearly displacing the blade holding plate parallel to the center of the blade attachment plate with the blade holder attachment previously having been detached or not manipulated, and the rotor tool blade is fixed to the blade attachment plate in step III by sliding back the blade holder plate.

* * * * *